July 19, 1949.
W. M. JEFFERS
2,476,873
MEANS FOR MAINTAINING MOTORS IN
PREDETERMINED ANGULAR RELATION
Filed Aug. 20, 1945
2 Sheets-Sheet 1
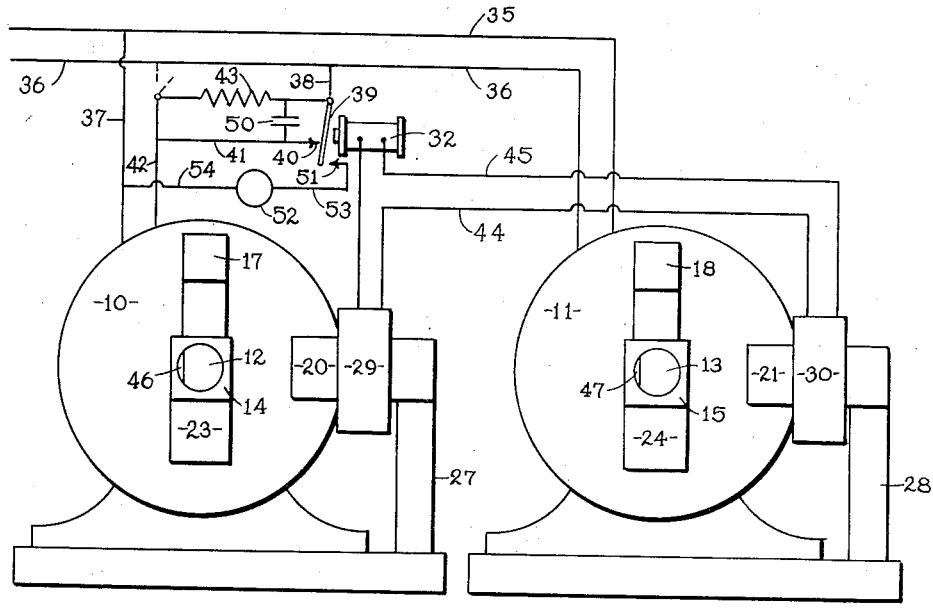
FIG·1
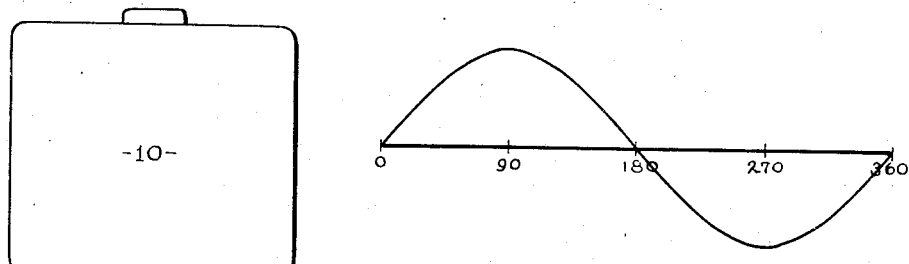
FIG·2
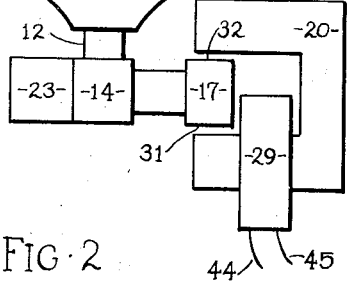
FIG·7
*INVENTOR.*
WALTER M. JEFFERS
*BY*
Bodell & Thompson July 19, 1949.  W. M. JEFFERS  2,476,873
MEANS FOR MAINTAINING MOTORS IN
PREDETERMINED ANGULAR RELATION Filed Aug. 20, 1945  2 Sheets-Sheet 2

*INVENTOR.*
WALTER M. JEFFERS
BY
*Bodell & Thompson*

Patented July 19, 1949

2,476,873

UNITED STATES PATENT OFFICE 2,476,873

MEANS FOR MAINTAINING MOTORS IN PREDETERMINED ANGULAR RELATION

Walter M. Jeffers, Syracuse, N. Y., assignor to Crouse-Hinds Company, Syracuse, N. Y., a corporation of New York Application August 20, 1945, Serial No. 611,638

5 Claims. (Cl. 318—437)

This invention has to do with apparatus for maintaining the rotors of a pair of synchronous motors in predetermined angular relation.

In connection with the operation of certain equipment, it is frequently necessary to employ a pair of synchronous motors, and it is further necessary that these motors be maintained in a certain predetermined angular relation. For example, a contact may be secured to the shaft of each of the motors and it may be desired to have these respective contacts simultaneously open or close electrical circuits, each of the motors, in such instance, being located an appreciable distance from the other, as in distant cities. Under these circumstances, when the motors are started and reach synchronous speed, the contacts operated by the motors may rotate in unison or, the contact of one of the motors may be positioned in angular relation to the contact operated by the other. For example, if the motors used are four-pole motors, the contact on one motor may be 90°, 180°, or 270°, out of register with the contact on the other motor at any particular instant.

This invention has as an object, means functioning automatically to quickly bring the rotors of the motors into the desired predetermined angular relation and, of course, being synchronous motors, that relationship is maintained as long as the motors operate in synchronism. In the event of voltage drop, overload, or any reason, one or both of the motors should drop out of synchronism and accordingly, lose the predetermined angular relationship, the means referred to is operable automatically to restore such relationship while the motors are in operation.

The invention has as a further object a structure which is operable during operation of the motors to adjust, or to vary, the angular relation between the rotors of the motors. That is, a contact, or any other mechanism secured to or rotated by the rotor shafts of one motor may be made to rotate in unison, or in any one of a plurality of desired angular relationships with a contact, or the like, secured to or rotated by the other motor.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a pair of motors and the apparatus employed in connection therewith for maintaining the rotors of the motors in a predetermined angular relation.

Figure 2 is a top plan view of one of the motors and control apparatus shown in Figure 1.

Figure 7 is a diagram of the wave produced by the apparatus shown in Figures 3 and 4.

Figure 3:
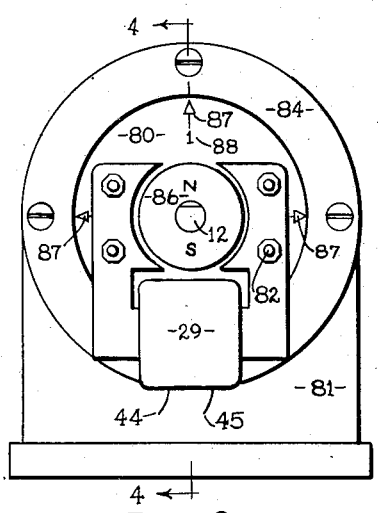
Figure 3 is a front elevational view of a motor equipped with a modified form of apparatus by which the angular relationship of the motors may be adjusted or varied.

The synchronous motors are indicated at 10, 11, having rotor shafts 12, 13, on which are secured members 14, 15, Figures 1 and 2, and which carry elements 17, 18. As the rotor shafts 12, 13, revolve, the elements 17, 18, pass in juxtaposition to U-shaped stationary pole members 20, 21.

As illustrated in Figures 1 and 2 of the drawings, the elements 17, 18, are in the nature of permanent magnets and constitute the rotating element of a current generating means. The elements 17, 18, are preferably counterbalanced by weights 23, 24, to reduce vibration. The members 20, 21, constitute the stationary elements of the generators, being here shown in the nature of U-shaped pole members mounted upon suitable supports 27, 28, and each carrying a coil, as 29, 30. The permanent magnets 17, 18, are arranged parallel with the motor shafts 12, 13, respectively. That is, with their north and south poles indicated at 31, 32, Figure 2. It will be obvious that each time the revolving elements 17, 18, pass through the pole pieces 20, 21, a current is generated in the coils 29, 30. These coils are connected in series with the relay coil 32 and in such manner that the potential generated in each one of the coils 29, 30, is opposed to, or cancels the potential generated in the other coil, if the rotating elements 17, 18, simultaneously pass in juxtaposition to the stationary pole pieces 20, 21. When this happens no current is produced to energize the relay coil 32.

One of the motors, such as 11, Figure 1, is connected directly to the alternating current source by the conductors 35, 36. The motor 10 is likewise directly connected to the conductor 35 through wire 37. However, the opposite side of the motor 10 is connected to the conductor 36 through wire 38 and normally closed contacts 39, 40 of the relay, and wires 41, 42. A resistor 43 is connected across the normally closed contacts 39, 40, that is, between the wires 38 and 42. With this arrangement, the motor 10 is provided with full line voltage at the start.

The coils 29, 30, are connected in series with the relay coil 32 through wires 44, 45. When the alternating current is supplied to the wires 35, 36, the motors will start but invariably one motor will reach synchronism ahead of the other and/or when both motors reach synchronism, a selected point on the rotor shafts 12, 13, such as the flats indicated at 46, 47, will not rotate in unison and, inasmuch as the permanent magnets 17, 18, are fixedly secured to the rotor shafts, they also will not be rotating in unison, but may rotate in angular relation, the angle depending upon the number of poles in the motors. For example, if the motors are four-pole motors, in any one instant the permanent magnet, associated with the motor 11, may be in the vertical position, as shown in Figure 1, but the magnet associated with motor 10 may be in juxtaposition to the pole piece 20, or positioned downwardly opposite from the vertical position shown or, it may be positioned to the left, diametrically opposite the pole piece 20. When this situation prevails, each of the coils 29, 30, will be energized during each rotation of the shafts 12, 13, but at different times, and the current so induced in the coils 29, 30, is effective to energize the relay coil 32 and move the movable contact 39 out of engagement with contact 40 thus interrupting the direct feed to the motor 10 from wire 36, through wires 41, 42, and causing the current to flow through the resistor 43 which is effective to reduce the speed of motor 10.

A condenser 50 may be connected across the contacts 39, 40, to reduce sparking at the contacts. Through the speed reducing effect of the resistor 43, the motor 10 will slow down and in doing so, the permanent magnet 17 will eventually fall in step with the rotation of magnet 18 by motor 11. When this happens, both of the coils 29, 30, are simultaneously energized and, inasmuch as these coils are connected in reverse, as previously stated, no potential will be supplied to the relay coil 32, and the contacts 39, 40, will assume their normally closed position, reconnecting the motor 10 directly to the line 35, 36, where it will continue to operate in synchronism.

The resistor 43 is selected for the motor 10 so that it is effective to cause a very slight reduction in the speed of the motor in order that the motor will not drop sufficiently far out of synchronism to prevent it from coming into synchronism substantially instantaneously when the contacts 39, 40 close.

The motors 10, 11 may be spaced a considerable distance apart, perhaps several miles, and if desired a signal may be incorporated in the apparatus to indicate whether the rotors of the two motors are operated at the desired predetermined angular relationship. This can be accomplished by providing the relay with a front contact 51 connected to a pilot lamp 52 through wire 53, the other side of the lamp being connected to the wire 37, through wire 54. With this arrangement, the lamp 52 will be lighted when the motors are not operating at the desired angular relation inasmuch as at that time contact 39 will be in engagement with contact 51.

Figure 5:
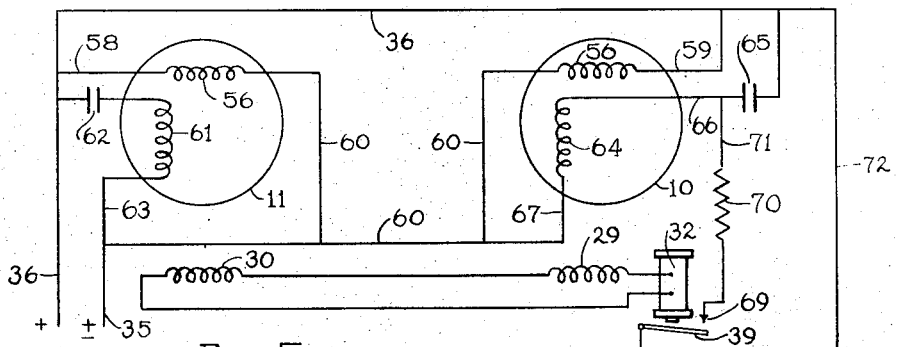
Figure 5 is a circuit diagram applied to capicitor type motors.

I have found the arrangement described to work entirely satisfactory with various motors including those of the shaded pole construction. If the motors are of the capacitor start, capacitor run type, the connections may be as shown in Figure 5 in which the coils 56 of the motors 10, 11, are connected to the wire 36 through wires 58, 59, the other side of the coils being connected to the wire 35 by wires 60. The other coil 61 of the motor 11 is connected to wire 36 through condenser 62, and the other side of the coil is connected to the wire 35, through wire 63. The similar coil 64 of motor 10 is likewise connected to wire 36 through the condenser 65, wire 66, and the other side of the coil to the wire 60, through wire 67. The generator coils 29, 30, associated with the motors 10, 11, are series connected with the relay coil 32, as previously described, and in this instance the contact 39 thereof is normally out of engagement with contact 69. The contact is connected to the resistor 70, and the other side of the resistor is connected to the wire 66, through wire 71. The movable contact 39 is connected to the line wire 36 through wire 72. With this arrangement, when the coil 32 is energized, the condenser 65 is shunted by the resistor 70, thereby partially nullifying the effect of the condenser and accordingly, the normal phase relation between coils 56, 64 of motor 10, and causing it to reduce its speed until the rotors of the motors 10, 11, have reached the desired relationship, whereupon the relay 32 becomes deenergized, as explained in connection with Figures 1 and 2.

Figure 6:
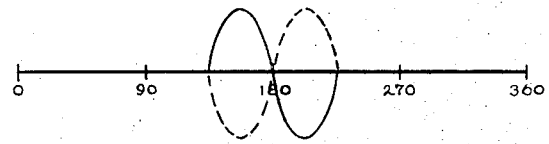
Figure 6 is a diagram of the wave form produced by the apparatus shown in Figures 1 and 2.

Figure 6 illustrates the wave form produced by the generator structure discussed in connection with Figures 1, 2 and 3, the heavy line 75 indicating the potential produced in one of the coils 29, 30, and the dotted line 76 the potential produced in the other of the coils. This wave diagram is illustrative of the potential in one coil cancelling the potential produced in the other of the coils 29, 30, when the magnets 17, 18 are rotating in unison. It will be understood that the wave form indicated by either of the curves 75, 76, may be displaced relatively to the other along the horizontal line if the rotors are not operating in unison.

Figure 4:
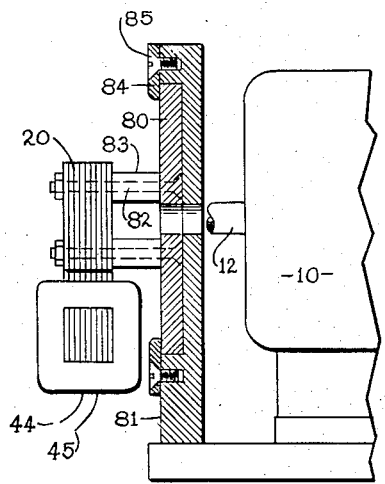
Figure 4 is a vertical sectional view of the control apparatus taken on line 4—4, Figure 3.

In Figures 3 and 4, I have illustrated apparatus by which the angular relation between the rotors of the motors may be varied while the motors are in operation. In this instance, the pole piece 20, associated with the motor 10, is mounted upon an annular member 80 which is rotatably mounted in a circular recess formed in a support 81. The pole member 20 is mounted on the annular member 80, as by studs 82 and spacing collars 83, the member 80 being frictionally retained in the support 81 by an annular member 84 secured to the support as by screws 85 and overlapping the marginal edge portion of the member 80, the arrangement being such that the member 80 and the pole member 20 carried thereby may be rotated relative to the support 81 and will remain in any adjusted position.

The support 81 is provided with an aperture through which the motor shaft 12 extends and on the outer end of which is mounted a permanent magnet rotor 86 formed with north and south pole portions indicated by the letters N and S, and which is effective upon rotation to induce a current in the coil 29 mounted upon the pole piece 20 in a manner similar to the induction of current, as in the structure described in connection with Figures 1 and 2 of the drawing.

The annular member 80 may carry legends in the nature of arrows indicated at 87, and which may have associated therewith numeral, as indicated at 88, to properly indicate the amount of angular offset which, it will be apparent, is obtained by rotating the pole member 20 about the axis of the motor shaft 12. The cylindrical permanent magnet rotor 86 is preferable to the elements 17, 18, shown in Figures 1 and 2, in that it is more economical to manufacture and produces a full sine wave, as indicated in Figure 7.

It will be apparent that many modifications can be made in the structural details of the apparatus without departing from the spirit of the invention. For example, other forms of generator apparatus can be employed for energizing the control relay 32. For example, a rotor can be mounted upon the motor shafts and formed with a plurality of field or pole pieces, each with its individual coil, and the current can be taken from the coils by a commutator or slip ring arrangement, and the angular relation between the rotors of the motors can be changed by shifting the associated brush rigging to select various ones of such coils on the rotating member. It will also be obvious that the invention can be readily applied to two or three phase motors.

I have found, through extensive commercial use, that the apparatus described is most efficient and effective for positioning the rotors of the motors in a desired angular relation, and for maintaining that relation during operation of the motors.

What I claim is:

1. Means for maintaining the rotors of a pair of synchronous motors in a predetermined angular relation comprising a speed regulating device associated with one motor and operable when connected in circuit therewith to vary the speed of said motor, a relay operable to connect said speed reducing device in circuit with said one motor, and a generator fixedly coupled to each motor, the output of said generators being connected to operate said relay when said motors are not rotating in said predetermined angular relation.

2. Means for maintaining the rotors of a pair of synchronous motors in a predetermined angular relation comprising a speed reducing means associated with one of said motors and operable when connected in circuit therewith to reduce the speed of said one motor, a relay normally connecting said one motor to the power circuit and being operable to connect said speed reducing means in circuit with said motor, a generator associated with each of said motors and having their rotors fixedly coupled to said motors respectively, the output of said generators being connected to said relay to operate the same when said motors are not rotating in said predetermined angular relation.

3. Apparatus for maintaining the rotors of a pair of synchronous motors in a predetermined angular relation comprising a speed regulating device associated with one motor and operable when connected in circuit therewith to vary the speed of said one motor, a relay operable when energized to connect said speed regulating means in circuit with said one motor, a generator associated with each of said motors and being of the type generating an impulse during a portion of each revolution of said motors, the rotors of said generators being fixedly coupled to said motors respectively to simultaneously generate an impulse of peak voltage when the rotors of said motors are rotating in said predetermined angular relation, said generators being connected in series with said relay and the output of one generator being opposed to the output of said other generator, whereby when said motors are not rotating in said predetermined angular relation, said relay is energized.

4. Apparatus for maintaining the rotors of a pair of synchronous motors in a predetermined angular relation comprising a speed regulating device associated with one of said motors and operable when connected therewith to vary the speed of said one motor, a relay operable when energized to connect said speed regulating means in circuit with said one motor, a generator associated with each of said motors and being of the type generating an impulse during a portion of each revolution of their rotors, the rotors of said generators being fixedly coupled to said motors respectively to generate impulses of peak voltage successively during each revolution of said motors when the same are not rotating in said predetermined angular relation, and to simultaneously generate such impulses when the motors are rotating in said predetermined angular relation, said generators being connected in series with said relay, and the output of one generator being opposed to the output of said other generator, whereby said relay is energized by said generators when said motors are not rotating in said predetermined angular relation.

5. Apparatus for maintaining the rotors of a pair of synchronous motors in a predetermined angular relation comprising a speed regulating device associated with one of said motors and operable when connected therewith to vary the speed of said one motor, a relay operable when energized to connect said speed regulating means in circuit with the said one motor, a generator associated with each of said motors, each of said generators including an inductor rotor fixedly coupled to the shaft of the associated motor and a stator element, said generators being of the type generating an impulse during a portion of each revolution of their rotors, the stators of said generators being adjustable about the axis of said rotors to vary the time of the generation of said impulse in respect to the angular position of the shaft of the associated motor, said generators being connected in series with said relay and adjusted to generate impulses of peak voltage successively during each revolution of said motors when the same are not rotating in said predetermined angular relation, and to simultaneously generate such impulses when the motors are rotating in said predetermined angular relation and the output of one of said generators being opposed to the output of the other generator, whereby said relay is energized by said generators when said motors are not rotating in said predetermined angular relation.

WALTER M. JEFFERS.

REFERENCES CITED

The following references are of record in the file of this patent:

UNITED STATES PATENTS

| Number | Name | Date |
|---|---|---|
| 1,767,236 | Bock | June 24, 1930 |
| 1,963,246 | Purington | June 19, 1934 |
| 2,228,079 | Gulliksen | June 7, 1941 |

FOREIGN PATENTS

| Number | Country | Date |
|---|---|---|
| 389,447 | Great Britain | June 9, 1931 |
| 413,278 | Great Britain | July 10, 1934 |